Feb. 21, 1956 — A. Y. DODGE — 2,735,528
TOOTH CLUTCHES
Filed Feb. 28, 1951
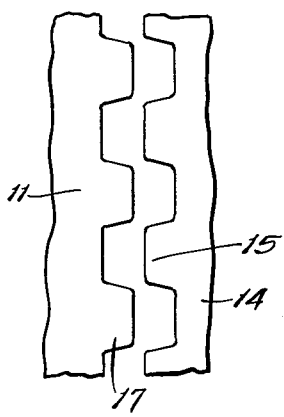
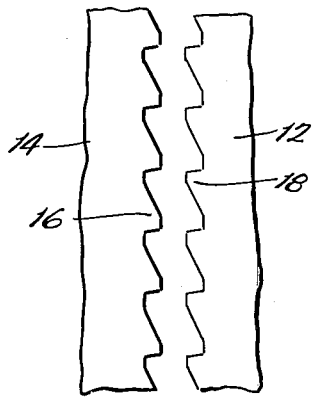
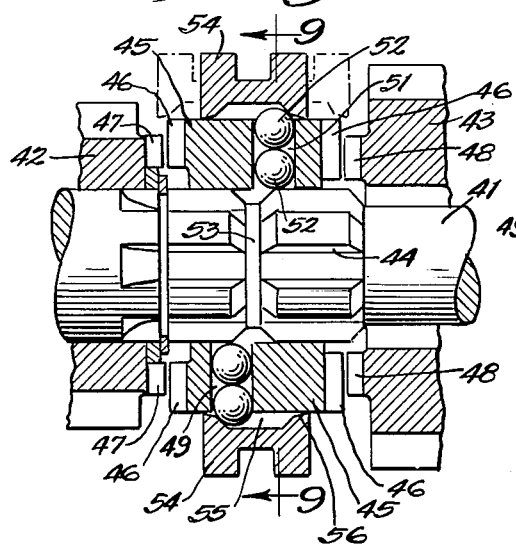
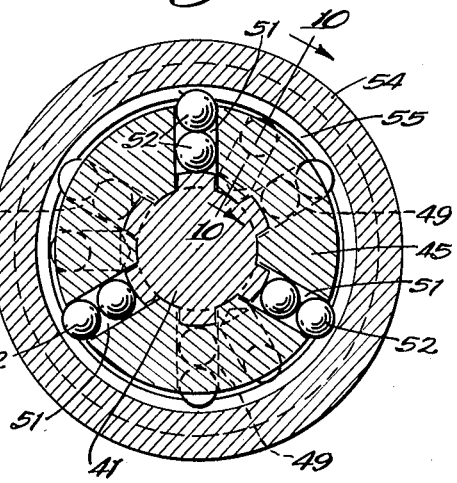
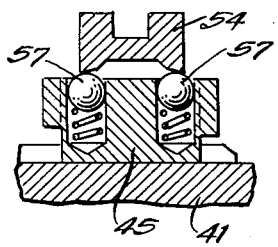
INVENTOR:
Adiel Y. Dodge,
BY
E. S. Birth,
ATTORNEY.

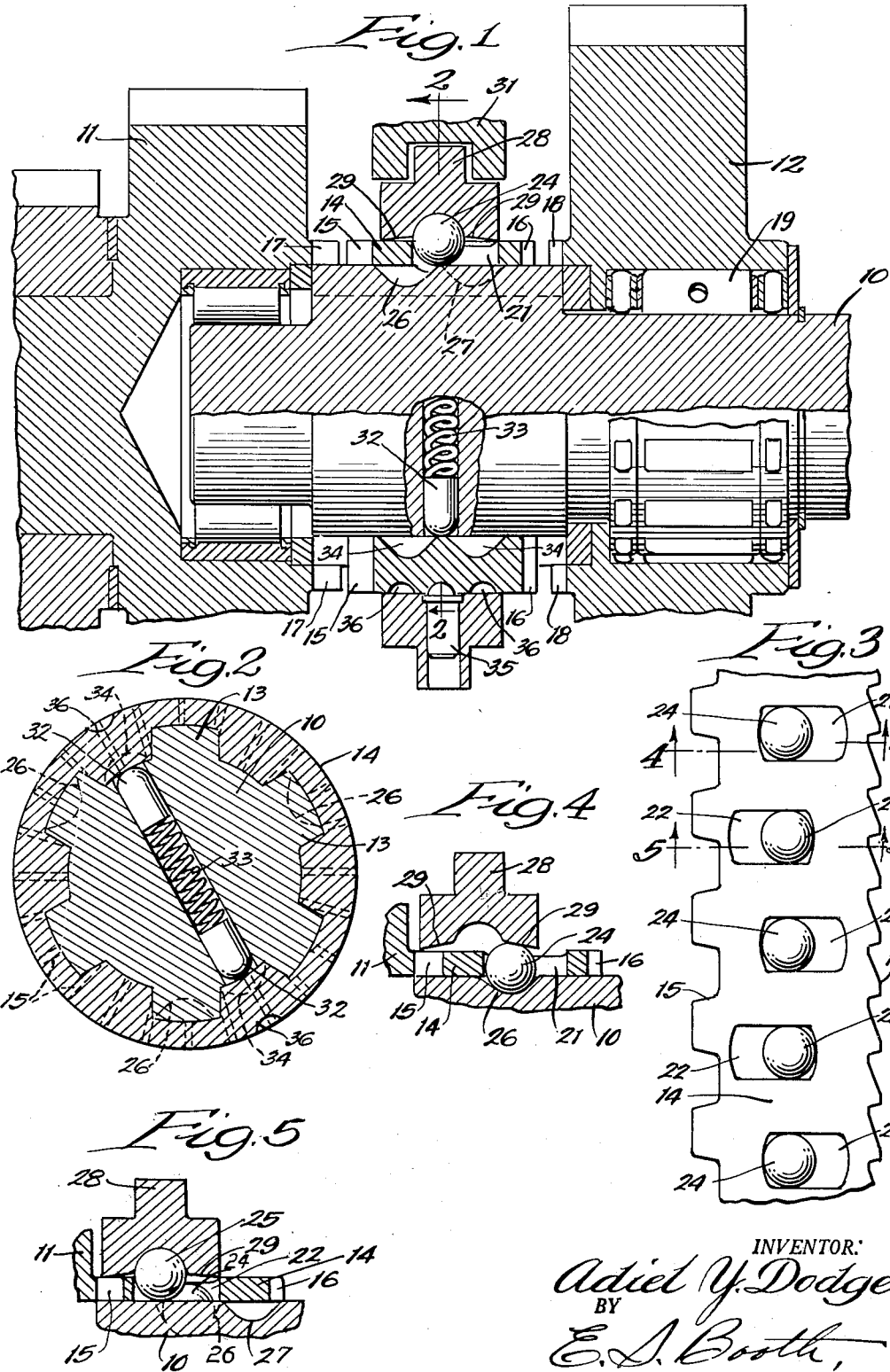

United States Patent Office 2,735,528
Patented Feb. 21, 1956

2,735,528

TOOTH CLUTCHES

Adiel Y. Dodge, Rockford, Ill.

Application February 28, 1951, Serial No. 213,141

8 Claims. (Cl. 192—48)

This invention relates to tooth clutches and, more particularly, to clutches which can be easily engaged and disengaged under load.

In many types of mechanisms, such, for example, as shiftable gear transmissions, it is desired to provide positive type clutches which engage and disengage for different driving conditions. The tooth type clutches commonly used in transmissions and like mechanisms have relatively square teeth so that they can be held in engagement easily. Such clutches are difficult to disengage, when under load. Such clutches are not easy to engage except when the parts are stationary, or are accurately synchronized. When under load, they develop such high frictional forces between the splines and the mating surfaces of the teeth that they cannot readily be disengaged. It is highly desirable in transmissions and like mechanisms to be able to disengage the clutches easily and engage them with less accurate synchronization. To be unable to disengage them at any time, when they are transmitting relatively heavy loads is their great shortcoming.

It is the chief object of the present invention to provide a tooth clutch in which the teeth are formed for easy disengagement under load and are held in engaged position by an easily releasable locking means.

It is also an object to improve the engaging characteristics so that engagements may be made more readily at somewhat greater differences in speed.

Another object is to provide a tooth clutch in which the clutch sleeve is shifted through actuating and locking means which also functions to hold the sleeve in its clutch engaging position.

Still another object is to provide a tooth clutch in which the clutch can be held in engaged position by a relatively small shifting or holding force. In the preferred construction, the locking means are moved into their locking position by cam surfaces on a shift collar and are held in engaged position by similar cam surfaces at the flatter angle.

A further object is to provide a tooth clutch in which resilient detent means are provided, yieldingly to urge the clutch to its engaged position after initial movement thereof toward engagement.

According to one feature of the invention, two sets of actuating and locking members are provided, one of which functions to lock the sleeve in its clutch engaged position and the other of which connects the sleeve to the shift collar so that the sleeve can be moved to disengaged position.

According to another feature the sleeve may be provided with clutch teeth at each end to connect it selectively to either of two clutch members and has two sets of actuating and locking members effective alternately as the sleeve is moved in one direction or the other to lock the sleeve, the locking members which are not effective acting to connect the sleeve to the shift collar for shifting the sleeve to clutch disengaging position.

The above and other objects and advantages of the invention will be more readily apparent from the following description when read in connection with the accompanying drawing, in which Figure 1 is an axial section with parts in elevation of a tooth clutch mechanism embodying the invention;

Figure 2 is a transverse section on the line 2—2 of Figure 1;

Figure 3 is a developed plan view of the shift collar and locking members;

Figures 4 and 5 are partial sections on the lines 4—4 and 5—5 respectively of Figure 3;

Figures 6 and 7 are partially developed views of the clutch teeth at opposite ends of the sleeve;

Figure 8 is an axial section of an alternative construction;

Figure 9 is a transverse section on the line 9—9 of Figure 8; and

Figure 10 is a partial section on the line 10—10 of Figure 9.

The clutch mechanism, as shown in Figures 1–7 may form a part of a selective gear transmission to connect a driving shaft 10 to either of two gears 11 or 12. It will be understood that the shaft 10 may be either the transmission input shaft or an intermediate or counter shaft in the transmission and that the gears 11 and 12 are typical of gears in the transmission which are to be made selectively effective by connecting them to the shaft 10 to produce different driving ratios.

Between the gears 11 and 12 the shaft is formed on its outer surface with splines 13, as best seen in Figure 2, which mate with internal splines in a sleeve 14 to mount the sleeve for axial sliding movement on the shaft, while holding it against rotation relative to the shaft. The sleeve is formed at its opposite ends with clutch teeth 15 and 16 to mesh respectively with teeth 17 and 18 formed on annular clutch collars on the gears 11 and 12. When the sleeve 14 is in its central position, as shown, both sets of clutch teeth are out of engagement. When the sleeve is shifted to the left, the teeth 15 and 17 will engage to connect the gear 11 to the shaft, and when the sleeve 14 is shifted to the right, the teeth 16 and 18 will engage to connect the shaft to the gear 12.

The teeth 15 and 17 are preferably shaped, as best seen in Figure 6, so that they taper outward with an angle whose tangent is equal to or in excess of the sum of the coefficients of friction between the mating surfaces of the splines and the teeth. With this type of tooth, engagement can be effected more easily even when the teeth are moving relative to each other because of the large gaps between the outer ends of the teeth as compared to the width of the tooth ends. Thus, even under load, it is possible to bring the teeth 15 into engagement with the teeth 17 and after they are engaged, the torque transmitted between them tends to separate them to help disengage the clutch.

The gear 12 may be connected to the shaft through a one way clutch 19 which will hold the gear and shaft against relative rotation in one direction. When such a clutch is used, the teeth 16 and 18 are preferably shaped, as best seen in Figure 7, with ratchet type teeth having a relatively flat slope on one side and terminating in shoulders which lie at a relatively small angle to the shaft axis, the angle being such that its tangent is approximately equal to or slightly greater than the sum of the coefficients of friction between the mating teeth and spline surfaces. The teeth are so positioned that the obtuse angle shoulders thereon will transmit torque between them in a relative direction of rotation opposite to that in which the clutch engages. Due to the ratchet shape of the teeth 16 and 18, it will be apparent that eventual engagement is assured. A locked condition in which the clutch is preloaded sufficiently to prevent disengagement of the teeth is prevented by the obtuse ejection angle. This feature is very advantageous for constructions utilizing one way clutches in conjunction with positive clutches, thereby to avoid a severe locked condition.

To shift the sleeve in its opposite directions the sleeve is provided with two sets of axially elongated openings 21 and 22 extending therethrough. The openings are preferably staggered first in one direction and then in the other, as best seen in Figure 3, and receive actuating and locking members shown as balls 24 and 25 respectively. Preferably the slots are so positioned that when the balls 24 and 25 lie in the same radial plane as indicated in Figure 3 each ball will be in engagement with the end of its slot closest to the center of the sleeve. The balls 24 are adapted to be received in recesses 26 which lie adjacent to the gear 11 and the balls 25 are adapted to be received in similar recesses 27 which lie adjacent to the gear 12. The recesses 26 and 27 are circumferentially staggered and are preferably formed in the outer surfaces of the splines 13, as shown in Figure 2.

The balls 24 and 25 are received in an internal groove or set of recesses in a shift collar 28 which is slidable axially on the sleeve. The groove or recesses in the collar 28 is formed with side surfaces which lie at acute angles to the axis of the shaft and which converge outwardly so that when force is exerted on the shift collar 28, it tends to cam the balls radially inward toward the recesses. The surfaces of the shift collar beyond the groove or recesses lie at smaller acute angles to the shaft axis as indicated at 29 to exert a greater inward force on the balls in response to the same axial force on the shift collar so that the clutch can be held locked in its engaged position with a relatively small degree of force. The shift collar may be moved by a yoke 31. Preferably the yoke has a relatively wide groove therein fitting over a somewhat narrower smaller annular projection on the shift collar to form a lost motion connection between them.

In order to urge the sleeve resiliently to a position of complete clutch engagement in either direction once the sleeve has been shifted from center, a spring detent means is provided. As shown in Figures 1 and 2, the detent means comprises a pair of plungers 32 slidable in a diametric bore in the shaft 10 and urged apart by a spring 33 lying in the bore. The internal surface of the collar 28 is provided with a pair of axially spaced recesses 34 adjacent to each of the plungers 32 into which the plungers move as soon as the sleeve is shifted from its centered position as illustrated. During the initial shifting movement of the sleeve, the plungers will move partially into one or the other of the recesses 34 and will exert a camming effect on the sides of the recesses tending to move the sleeve axially. With this construction, if the teeth should abut end to end when a shift is attempted, the yoke 31 can travel to its full shifting distance, but the collar and sleeve will stop when the ends of the teeth abut. The detent means will, however, maintain an axial pressure on the sleeve so that as soon as the teeth are moved out of abutting relation during the first relative rotation between the sleeve and the gear or clutch member, the teeth will be moved fully into engagement. An additional spring detent 35 may be provided in the collar 28 to engage recesses 36 in the outer surface of the sleeve yieldingly to hold the collar in the proper position on the sleeve.

In operation of this construction, assuming it is desired to engage the clutch teeth 15 and 17, the yoke 31 will move to the left to move the collar 28 to the left. As soon as the balls 24 come into register with the recesses 26, they will be cammed into the recesses but since they still engage the ring 14 and the groove or recesses in the collar, the collar will continue to move the sleeve through the balls 24. After the balls 24 start to move into the recesses, the collar will slide axially relative to the sleeve, the balls 25 traveling through the slots 22 at this time to permit such relative movement. Continued movement of the collar will bring it to the position shown in Figure 4 relative to the balls 24 so that the flat cam surface 29 engages the balls 24. This surface provides a high mechanical advantage which will hold the balls 24 in the recesses in response to a relatively small axial force on the collar such as that provided by the detent 35. Thus the teeth 15 and 17 will be held fully in engagement once they are engaged.

At the same time the balls 25 will have travelled through the slots 22 to the position shown in Figure 5. It will be noted that these balls are held in full engagement with the groove or recesses in the collar 28, since they ride on a smooth surface on the shaft 10. Therefore when it is desired to disengage the clutch, the balls 25 provide connecting means between the collar and the sleeve through which the sleeve can be shifted back to its centered position, as shown in Figure 1. The relatively long slots 21 and 22 provide a lost motion connection for this purpose to enable the collar to shift relative to the sleeve into a position where the flat cam angles 29 can become effective. For engaging the teeth 16 and 18, the operations are identical except that in this case the balls 25 function as locking members by moving into the recesses 27 and the balls 24 move through the elongated openings 21 to provide a lost motion connection between the collar and the sleeve.

The construction shown in Figures 8–10 functions in much the same manner as that in Figure 1 to accomplish the same purposes. The construction illustrated in these figures includes a shaft 41 which is adapted to be connected to either of two clutch members or gears 42 or 43 which are rotatable on the shaft. The shaft 41 is formed with a plurality of elongated splines 44 which interfit with internal splines in a sleeve 45. The sleeve 45 is formed with clutch teeth 46 at its ends to mesh with complementary teeth 47 and 48 on the gears or clutch members 42 and 43.

The sleeve 45 is formed with two sets of axially spaced bores or openings 49 and 51 which receive actuating and locking members shown as balls 52. In this case the sleeve is relatively thick and two balls 52 are mounted in each of the openings, although the construction can function equally well with only one ball or with more than two balls in each opening.

The splined portion of the shaft is formed with recesses to receive the balls and which lie in a common plane between the planes of the two sets of openings 49 and 51. For convenience of manufacture, the recesses are formed by cutting an annular groove 53 through splines 44 to receive the balls 52 corresponding to either of the sets of openings depending upon the location in which the sleeve is shifted. The sleeve is shifted through an annular collar 54 formed on its inner surface with a relatively wide groove 55 terminating at its sides in cam surfaces lying at an acute angle to the shaft axis. The edge portions of the collar beyond the groove terminate in cam surfaces 56 lying at smaller acute angles to the shaft axis and corresponding to the surfaces 29 of Figures 1–7. The surface 29 may be cylindered, thus making the acute angle equal to 0°.

The collar is urged in one direction or the other after each has been initially shifted by means of a pair of spring detents 57 carried by the sleeve 45 and engaging the inner surface of the collar at axially spaced points. With the collar in its centered position, in which both clutches are disengaged, the detents 57 will balance each other in the position shown in Figure 10. However, when the collar is shifted in one direction or the other, one or the other of the detents will engage the cam surface at the corresponding side of the groove 55 to urge the collar in the direction in which it was partially moved. These detents perform the same function as the detents 32 of Figures 1–7 to insure full clutch engagement until the collar is moved back to release the clutch. A yielding force applied to the shift yoke may be employed in place of the detents.

In this construction, assuming that the collar is to be shifted to the left to engage the teeth 46 with the teeth 47, the collar will first be moved to the left hand dotted position illustrated in Figure 8. As the collar moves, the sleeve will initially move with it until the balls 52 in the openings 51 come into registery with the recess 53 and are cammed into it. At this time, the collar can continue to move through the lost motion connection provided by the axially elongated groove 55 to bring the flat cam surface 56 at the right of the collar into engagement with the balls 52. At this time, the left hand detent 57 will be effective to urge the collar fully to the left and to hold it to the left, thereby to hold the balls 52 in openings 51 in the recess 53. In this way the clutch will be held in fully engaged position until the collar is moved back to its centered position, as shown. It will be noted that the balls in the openings 49 function as connecting members during the return or clutch disengaging movement of the collar so that the collar can positively move the sleeve regardless of load conditions, after the locked balls have been unlocked by the first part of sleeve movement.

While two embodiments of the invention have been shown and described in detail herein, it will be understood that these are illustrative only and are not to be taken as a definition of the scope of the invention, reference being had for this purpose to the appended claims.

What is claimed is:

1. A tooth clutch comprising a shaft, a sleeve mounted on the shaft for axial sliding but held against rotation relative to the shaft, a pair of clutch members around the shaft adjacent to the opposite ends of the sleeve, the clutch members and the ends of the sleeve being formed with clutch teeth to interengage when the sleeve is moved toward the respective clutch members, the sleeve having two sets of openings therein, the shaft having axially spaced sets of recesses therein one to register with one set of openings when the sleeve is moved toward one of the clutch members and the other to register with the other set of openings when the sleeve is moved toward the other of the clutch members, actuating and locking members movable through the openings into the recesses, and a shift collar slidable on the sleeve and formed with an internal recess to receive the locking members, the internal recess having its sides lying at acute angles to the shaft axis to cam one set or the other of the locking members into the recesses when the shift collar is moved toward one or the other of the clutch members there being means to provide lost motion between the shift collar and the sleeve when either set of actuating and locking members is moved inward so that said set will be released before the shift collar engages the other set of actuating and locking members to move the sleeve through them.

2. A tooth clutch comprising a shaft, a sleeve mounted on the shaft for axial sliding but held against rotation relative to the shaft, a pair of clutch members around the shaft adjacent to the opposite ends of the sleeve, the clutch members and the ends of the sleeve being formed with clutch teeth to interengage when the sleeve is moved toward the respective clutch members, the sleeve having two sets of openings therein, the sets of openings being spaced axially of the sleeve, an annular recess in the shaft in a plane between the sets of openings, actuating and locking members movable through the openings into the recess, and a shift collar slidable on the sleeve and formed with an internal cam groove to receive the locking members, the sides of the cam groove forming cam surfaces to cam the locking members in one set of openings into the recess when the shift collar is moved in one direction and the locking members in the other set of openings into the recess when the shift collar is moved in the other direction, there being means to provide lost motion between the shift collar and the sleeve when either set of actuating and locking members is moved inward so that said set will be released before the shift collar engages the other set of actuating and locking members to move the sleeve through them.

3. A tooth clutch comprising a shaft, a sleeve mounted on the shaft for axial sliding but held against rotation relative to the shaft, a clutch member adjacent to one end of the sleeve, clutch teeth on the clutch member and said end of the sleeve to engage when the sleeve is moved toward the clutch member, the sleeve having an opening therethrough, a recess in the shaft to register with the opening when the sleeve is moved toward the clutch member, an actuating and locking member slidable through the opening and into the recess, a collar slidable on the sleeve and formed with a cam surface to cam the locking member into the recess when the collar is moved toward the clutch member, and means forming a lost motion connection between the collar and the sleeve, said means including a second opening through the sleeve spaced from the first named opening, and a locking member shorter axially than the second opening fitting therein, the collar having an interval recess therein to receive the last named locking member.

4. A tooth clutch comprising a shaft, a sleeve mounted on the shaft for axial sliding movement but held against rotation relative to the shaft, a clutch member adjacent to the sleeve, clutch teeth on the sleeve and the clutch member to engage when the sleeve is adjacent to the clutch member and to disengage when the sleeve is moved away from the clutch member, the sleeve having two sets of openings therein and the shaft having recesses therein to register with one set of openings when the sleeve is adjacent to the clutch member and with the other set of openings when the sleeve is away from the clutch member, two sets of actuating and locking members slidable through the sets of openings respectively, and a shift collar slidable over the sleeve and formed with an internal recess to receive both sets of locking members and terminating at its sides in inwardly facing cam surfaces, one set of locking and actuating members acting as actuating members to move the sleeve toward the clutch member and being cammed into the recesses by the shift collar in its extreme position toward the clutch member to lock the sleeve against movement, the other set of locking and actuating members acting as actuating members to move the sleeve away from the clutch member and being cammed into the recesses by the shift collar in its extreme position away from the clutch member, there being means to provide lost motion between the shift collar and the sleeve so that the locking members which are cammed into the recesses will be released before the shift collar moves the clutch sleeve through the other actuating and locking members.

5. A tooth clutch comprising a shaft, a sleeve mounted on the shaft for axial sliding movement but held against rotation relative to the shaft, a pair of clutch members adjacent to opposite ends of the sleeve, clutch teeth on the sleeve and the clutch members to engage when the sleeve is adjacent to the clutch members respectively, the sleeve having two sets of openings therein and the shaft having recesses therein to register with one set of openings when the sleeve is adjacent to one of the clutch members and with the other set of openings when the sleeve is adjacent to the other clutch member, two sets of actuating and locking members slidable through the sets of openings respectively, and a shift collar slidable over the sleeve and formed with an internal recess to receive both sets of locking members and terminating at its sides in inwardly facing cam surfaces, one set of locking and actuating members acting as actuating members to move the sleeve toward one of the clutch members and being cammed into the recesses by the shift collar in its extreme position toward said one of the clutch members to lock the sleeve against movement, the other set of locking and actuating members acting as actuating members to move the sleeve toward the other clutch member and being cammed into the recesses by the shift collar in its extreme position toward said other clutch member, there being means to provide lost motion between the shift collar and the sleeve so that the locking members which are cammed into the recesses will be released before the shift collar moves the clutch sleeve through the other actuating and locking members.

6. In a clutch, actuating and locking mechanism comprising a shaft, a sleeve mounted on the shaft and axially slidable thereon, the sleeve having two sets of spaced openings therein, the shaft being formed with recesses to register with one set only of said openings when the sleeve is moved axially in one direction from a neutral position on the shaft, actuating and locking members movable in the openings and of greater radial thickness than the sleeve, and a shift collar slidable on the sleeve and formed with an internal annular recess to receive the actuating and locking members, the recess terminating in axially extending cam surfaces at its sides to cam the locking members in said one set of openings into the recesses in the shaft when the collar is moved axially in said one direction on the sleeve, the annular recess and the other set of openings being of such size relative to the actuating and locking members as to provide for limited axial movement of the collar on the sleeve.

7. In a clutch, actuating and locking mechanism comprising a shaft, a sleeve mounted on the shaft and axially slidable thereon, the sleeve having two sets of spaced openings therein, the shaft having recesses therein to register with one set of openings when the sleeve is moved axially in one direction from a neutral position and with the other set of openings when the sleeve is moved axially in the other direction from the neutral position, two sets of actuating and locking members slidable through the sets of openings respectively, and a shift collar slidable over the sleeve and formed with an internal annular recess to receive the actuating and locking members and terminating at its sides in inwardly facing cam surfaces, the sets of members respectively acting as actuating members to move the sleeve in opposite directions and being cammed into the recesses respectively by the shift collar when it is moved in opposite directions on the sleeve, there being means to provide lost motion between the shift collar and the sleeve so that the locking members which are cammed into the recesses will be released before the shift collar moves the sleeve through the remaining actuating and locking members.

8. A tooth clutch comprising a shaft, a sleeve mounted on the shaft for axial sliding movement but held against rotation relative to the shaft, a clutch member adjacent to the sleeve, clutch teeth on the sleeve and the clutch member to engage when the sleeve is adjacent to the clutch member and to disengage when the sleeve is moved away from the clutch member, the sleeve having a plurality of spaced openings therein and the shaft having recesses therein to register with certain of said openings when the sleeve is adjacent to the clutch member and with the remainder of said openings when the sleeve is away from the clutch member, a plurality of actuating and locking members slidable through the openings respectively, and a shift collar slidable over the sleeve and formed with an internal recess to receive all of the locking members and terminating at its sides in inwardly facing cam surfaces, certain of the locking and actuating members acting as actuating members to move the sleeve toward the clutch member and being cammed into the recesses by the shift collar in its extreme position toward the clutch member to lock the sleeve against movement, the remainder of the locking and actuating members acting as actuating members to move the sleeve away from the clutch member and being cammed into the recesses by the shift collar in its extreme position away from the clutch member, there being means to provide lost motion between the shift collar and the sleeve so that the locking members which are cammed into the recesses will be released before the shift collar moves the clutch sleeve through the other actuating and locking members.

References Cited in the file of this patent

UNITED STATES PATENTS

| | | |
|---|---|---|
| 276,688 | Hartley | May 1, 1883 |
| 1,379,891 | Aichele | May 31, 1924 |
| 2,019,073 | Cooper et al. | Oct. 29, 1935 |
| 2,062,195 | Smith | Nov. 24, 1936 |
| 2,065,004 | Woolson | Dec. 22, 1936 |
| 2,101,897 | Coultas | Dec. 14, 1937 |
| 2,459,361 | Carnagua et al. | Jan. 18, 1949 |

FOREIGN PATENTS

| | | |
|---|---|---|
| 86,613 | Switzerland | Sept. 16, 1920 |
| 241,259 | Switzerland | July 1, 1946 |